United States Patent

Logan, II et al.

[11] 4,089,446
[45] May 16, 1978

[54] PORTABLE WATER SUPPLY AND DISBURSING UNIT

[76] Inventors: James H. Logan, II, 9943 Shoshone Way, Randallstown, Md. 21133; Richard J. Logan, Jr., 6504 Freedom Ave., Sykesville, Md. 21784

[21] Appl. No.: 724,227

[22] Filed: Sep. 17, 1976

Related U.S. Application Data

[63] Continuation of Ser. No. 584,882, Jun. 9, 1975, abandoned.

[51] Int. Cl.² .............................................. A01C 19/00
[52] U.S. Cl. .................................... 222/609; 222/626; 239/172; 248/14
[58] Field of Search ............... 222/178, 626, 609, 610; 239/172; 248/14, 16; 220/85 R

[56] References Cited

U.S. PATENT DOCUMENTS

| | | | |
|---|---|---|---|
| 1,506,652 | 8/1924 | Maker | 222/178 X |
| 3,151,563 | 10/1964 | Lita et al. | 222/178 X |
| 3,558,013 | 1/1971 | Ponzo et al. | 222/178 X |
| 3,797,743 | 3/1974 | Kommers et al. | 239/172 X |
| 3,837,539 | 9/1974 | Schlegel | 222/178 |

Primary Examiner—Robert B. Reeves
Assistant Examiner—Francis J. Bartuska
Attorney, Agent, or Firm—J. Wesley Everett

[57] ABSTRACT

A portable water supply and dispensing unit comprises a hydraulic pump having a low-voltage electric motor for operating the pump, both of which are mountable atop a water container, the electric motor being capable of being operated by a storage battery, particularly of the type of battery used in motor vehicles, the water container being provided with a pair of wheels fixed to the underside of the water container which also supports the pump and motor, for manually moving the unit about an area by means of a suitable handle member, the unit has many uses and is especially adapted to the washing of motor vehicles which are out of reach of the general water supply, such as vehicles parked in parking lots of high-rise apartment houses and the like.

2 Claims, 10 Drawing Figures

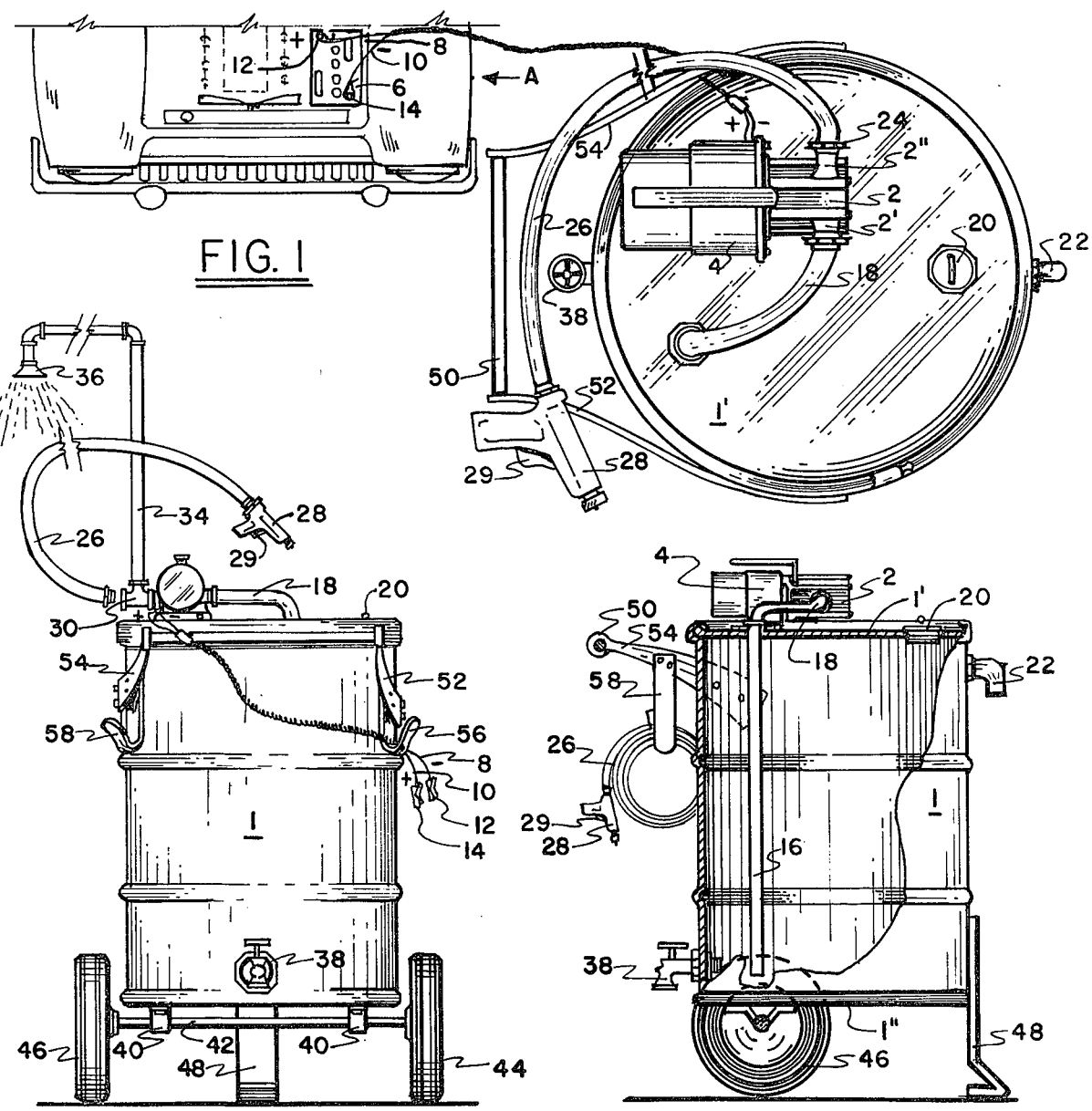
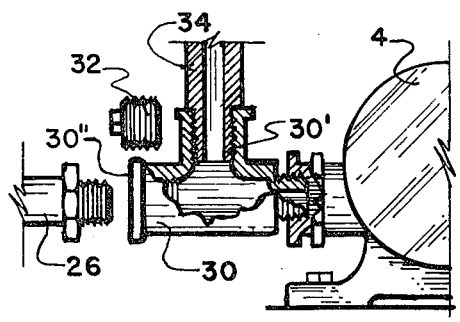

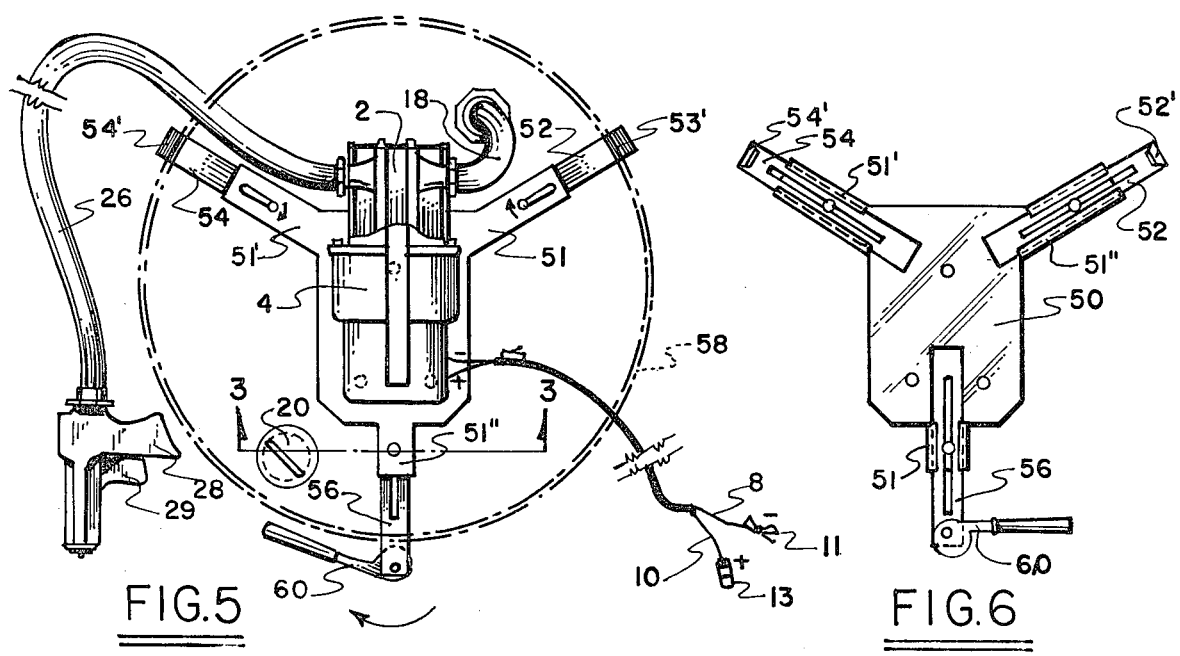
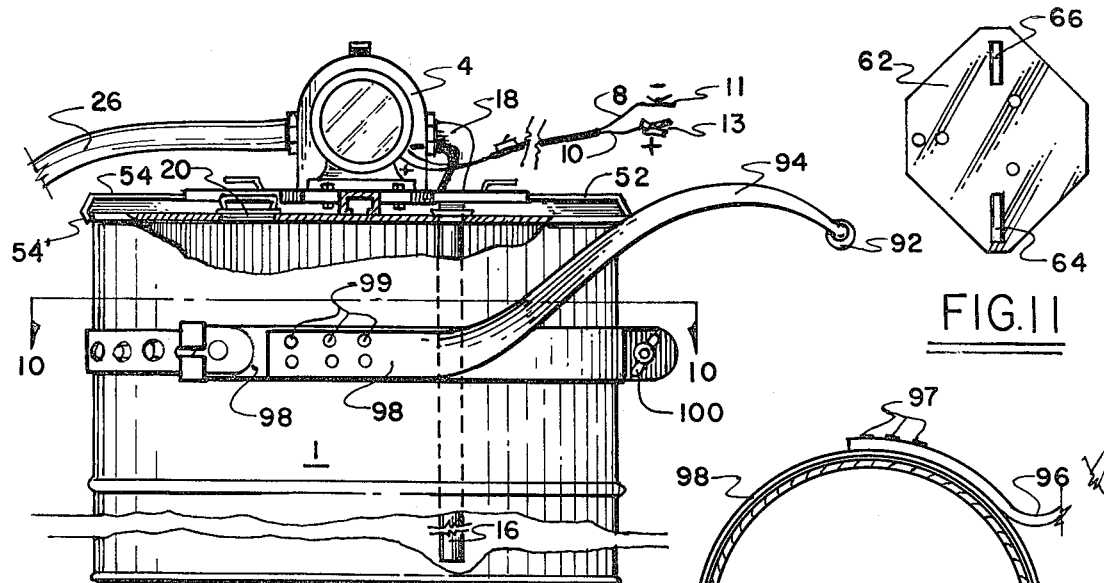
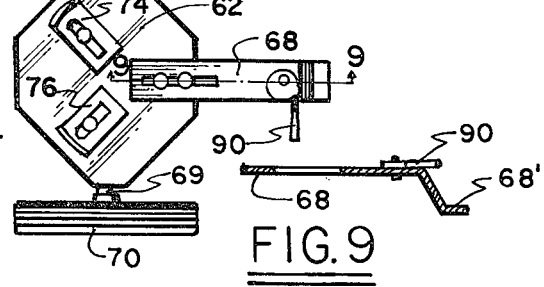
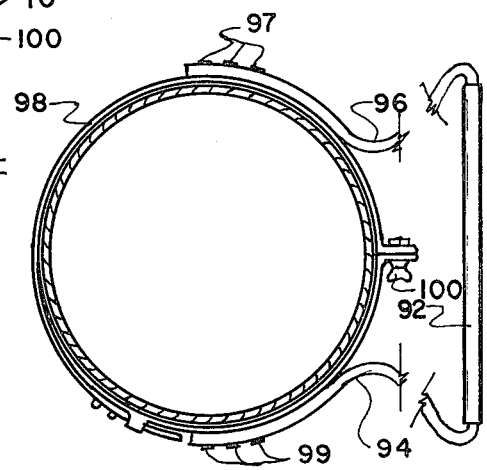

PORTABLE WATER SUPPLY AND DISBURSING UNIT

This is a continuation of application Ser. No. 584,882, art unit 311, filed June 9, 1975, now abandoned.

The present invention relates to a self-contained water supply and dispensing unit that may be moved about an area and capable of operating off a storage battery.

One object of the invention is to provide a unit for storing and dispensing a sufficient quantity of water for a particular purpose, such as, the washing of a motor vehicle.

A further object of the invention is to provide a unit that may be easily converted into a shower for camp sites.

Another object of the invention is to provide a unit that may be made into a kit that may be attached to a water container of a predetermined size and shape.

While several objects of the invention have been pointed out, other objects uses and advantages will become more apparent as the nature of the invention is more fully disclosed in the following detailed description with reference to the accompanying drawings, in which;

FIG. 1 is a top plan view of the unit showing the manner in which the unit may be connected to a vehicle storage battery.

FIG. 2 is a rear view in elevation of the unit.

FIG. 3 is an elevational view partly in section taken at right angles to the view shown in FIG. 2.

FIG. 4 is a detailed view partly in elevation and partly in sections showing means for attaching a shower to the pressure side of the water pump.

FIG. 5 is a top plan view of a modified form of unit.

FIG. 6 is a bottom plan view of one of the elements of the modified form.

FIG. 7 is a side view partly in elevation and partly in section showing the manner in which the modified form is attached to a water container.

FIG. 8 is a top plan view of a running gear and supporting wheels for the water container, on a reduced scale.

FIG. 9 is a sectional view taken on Line 9—9 of FIG. 8.

FIG. 10 is a sectional view taken on Line 10—10 of FIG. 7, and is on a reduced scale.

FIG. 11 is a top plan view of one of the elements shown in FIG. 8.

In reference to the drawings, like and similar reference characters are used to point out like and similar parts throughout the several views.

Referring to FIGS. 1 to 4, the unit comprises a water container 1 having a top 1' and a bottom 1". Fixed to the top 1' of the container is a fluid pump 2, having an inlet opening 2' in one side of the pump and an outlet opening 2" on the opposite side of the pump. The pump 2 is operated by a low voltage electric motor 4 operatable from a battery 6 normally carried by a motor vehicle A but the pump motor may also be operated by a battery carried by the unit itself. The leads 8 and 10 are normally fitted with a clamp means shown at 12 and 14 for clamping the terminal of the battery, best shown in FIG. 1, as shown at 12 and 14.

It is to be understood that the pump motor may also be operated from electric cells now being used in lawn mowers, grass clippers and so forth.

The pump 2 and the electric motor 4 are fixed to the top of the water container 1 by any suitable means. Extending downwardly from the top to a point adjacent the bottom of the container is a pipe or hose 16 of substantial rigidity. Extending from the intake side 2' of the pump to the pipe 16 is a flexible hose 18 which may be disconnected from the pump 2 or the pipe 16 to allow a water supply hose to be connected to either the flexible member 18 or the pipe 16 for refilling the container; however, the container may be provided with a fill hole covered by the cap 20 through which the container may be filled. The container is also provided with an overflow pipe 22 adjacent the upper end thereof.

The pressure side 2" of the pump 2 is provided with a connector 24 to which one end of an extended flexible hose 26 is attached for conveying water to the nozzle 28. The nozzle is preferably of a type to regulate the flow of water through the nozzle by operating the trigger lever 29. The unit may be converted to a shower as shown in FIGS. 2 and 4. In this arrangement there is provided a T-pipe joint 30 having its side opening 30' extending upwardly, which is normally closed by a plug 32. When it becomes desirable to convert the unit to a shower the hose 26 is removed from the T-joint, as shown in FIG. 4, along with the plug 32 being removed from the opening 30'. At this point, there is provided an upstanding pipe 34 which is threaded into the upstanding opening 30' of the T-joint and the plug 32 is placed in the opening 30" vacated by the hose 26. The pipe 34 may extend upwardly at any convenient distance and may also be provided with a shower head 36 at the upper end of the pipe 34 as shown in FIG. 2.

The water container may also be provided with a drain valve 38 for emptying or cleaning out the water container.

In order to move the unit about an area there is provided a running gear 40, which is attachable to the bottom of the container. This running gear is provided with a means for supporting an axle 42 at each end of which are wheels 44 and 46. These wheel supporting elements are placed adjacent one side of the container as shown in FIG. 3. At the opposite side of the container there is a rest member 48 which extends downwardly from the bottom of the container a distance of approximately the radius of the supporting wheels.

In order to manually maneuver the unit about the area there is provided a handle 50 which is supported at the outer end of the brackets 52 and 54; the opposite ends of the brackets being attached to the container adjacent the upper portion.

When the apparatus is being moved about the area or stored, there are provided hook like members 56 and 58 preferably attached to the hand brackets 52 and 54 for supporting the hose 26 and the electric members 8 and 10 when not in use.

It has been found by numerous tests that the electric motor will operate off a 12 volt motor vehicle battery for a sufficient time to exhaust the water container in a 55 gallon drum without any appreciable loss in the battery's potential.

In reference to the unit as a kit, this is shown in FIGS. 5 to 11 with various elements making up the unit being detachable from a water container. The water container may be of any size, such as a 55 gallon drum or a container that will accommodate the elements of the kit.

Referring to FIG. 5 the pump 2 and the electric motor 4 are substantially the same as previously described; however, these elements are mounted on a base 50, as shown in FIG. 6.

The base is provided with means 51, 51' and 51" for supporting at least three adjustable arms 52, 54 and 56. The arms 52 and 54 are provided with angled engaging elements 52' and 54' for engaging the upper end of a water container 58. The arm 56 is provided with an eccentric mounted lever 60, which when rotated will engage the water container to draw the elements 52' and 54' in tight connection with the container. The hose 26 and the nozzle 28 are the same as shown in FIGS. 1 and 2.

The means for supporting the water container are shown in FIGS. 8, 9 and 11 and comprises a plate 62 having axle supporting members 64 and 66 for supporting an axle 69. On each end of the axle 69 are wheels 70 and 72. The base plate 62 is provided on its upper surface with adjustable brackets 74 and 76 for engaging the rim of the water container. Extending outwardly from the base plate is a further adjustable member 68 for engaging the rim of the container and is in the form of an eccentrically mounted locking handle 90 for urging the members 74 and 76 in tight contact with the bottom rim of the container. The outer end of the member 68 is bent downwardly to form a step 68' for supporting the bottom of the water container in the same plane with the brackets 74 and 76.

As another element of the kit there is provided a handle 92 and a pair of brackets 94 and 96 having one of their ends connected to the handle member 92 the opposite end of the brackets being connected to an adjustable band 98 by means shown at 97 and 99. When the band 93 is adjusted just short of the diameter of the container, the screw 100 is tightened to cause the band to snugly engage the container.

This modified form of the portable unit is designed to be made into a kit as in many cases the user already has a standard size drum.

The unit is shown being operated by a standard 12 volt battery as used by the average vehicle, but may use batteries of other voltage and capacity depending on the amount of water to be dispensed and the pressure desired.

The invention has been shown and described in a particular form, however, it is not intended as a limitation, as the scope of the invention is best defined in the appended claims.

We claim:

1. A portable vehicle washing machine comprising in combination:
   a. a circular-sided drum-like water container having a pair of circular end members hermetically sealed one to each end of the said circular side of the container in parallel spaced relationship to each other;
   b. a flat rigid base of an area less than either of the separate end members of the circular-sided drum-like water container;
   c. a plurality of adjustable arms having one end of each of the arms attached to the base and extending outwardly from the edge of the flat base and in a plane substantially parallel with the plane of the base, the outer ends of which extend beyond and downwardly over one end of the circular side of the water container for engaging said one end of the container;
   d. the downward extended end engaging means on the outer end of each arm are adapted to compressibly engage said one end of the container side and means associated with at least one of the end engaging means for reducing the distance between the clamping elements to compressibly clamp the base to said one end;
   e. a water pump having water intake and outlet openings therein, and a low voltage motor for operating said pump secured to the base;
   f. means connected with the inlet opening of the pump adapted to extend to a point adjacent the bottom of the drum for supplying water to the pump, and flexible means connected to the outlet opening in the pump to supply water under pressure to a nozzle.

2. A portable vehicle washing machine comprising in combination:
   a. a circular-sided drum-like water container having at least one circular end member hermetically sealed to at least one end of the circular-sided water container and in a plane substantially perpendicular to the said circular-sided container;
   b. a flat rigid base of an area less than either end of the circular sided water container;
   c. a plurality of adjustable arms having one end of each of the arms attached to the base and extending outwardly from the edge of the flat base and in a plane substantially parallel with the plane of the base, the outer ends of which extend beyond and downwardly over the upper end of the circular side of the water container for engaging said upper end of the container side;
   d. the downward extended end engaging means on the outer end of each arm are adapted to compressibly engage said upper end of the container side and means associated with at least one of the end engaging means for reducing the distance between the clamping elements to compressibly clamp the base to said upper end of the container side;
   e. a water pump having water intake and outlet openings therein, and a low voltage motor for operating said pump secured to the base;
   f. means connected with the inlet opening of the pump adapted to extend to a point adjacent the bottom of the drum for supplying water to the pump, and flexible means connected to the outlet opening in the pump to supply water under pressure to a nozzle.

* * * * *